R. MILNE.
GEARING.
APPLICATION FILED AUG. 20, 1908.
913,417.
Patented Feb. 23, 1909.
3 SHEETS—SHEET 1.
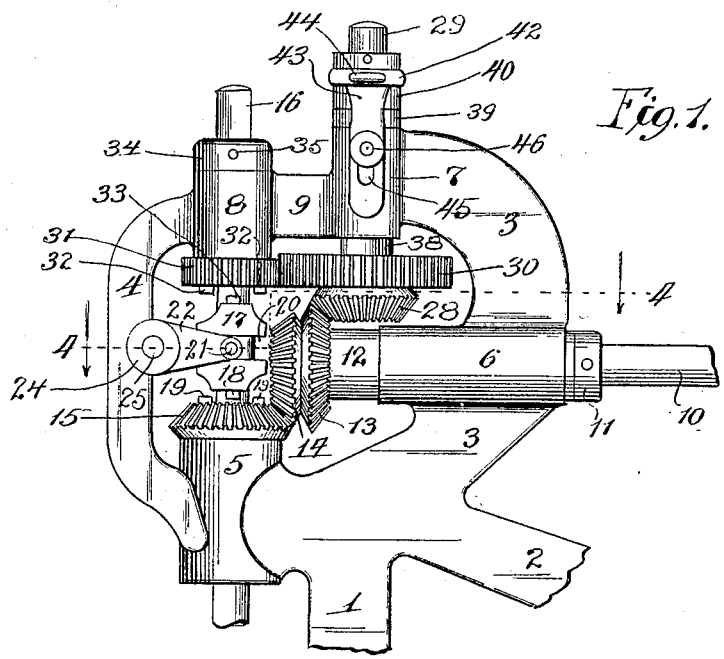
Fig. 1.
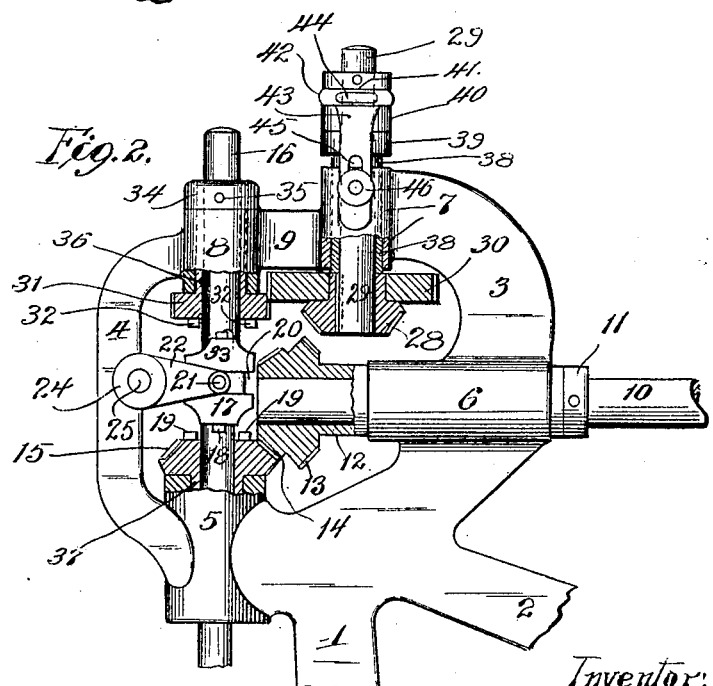
Fig. 2.
Witnesses:
Inventor:
Robert Milne
Attys.

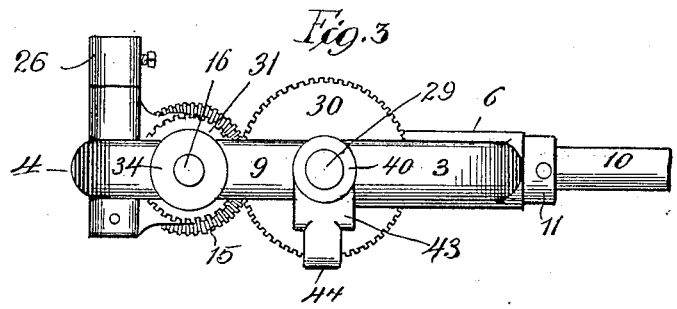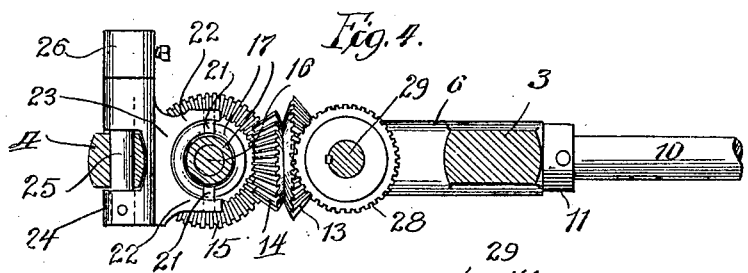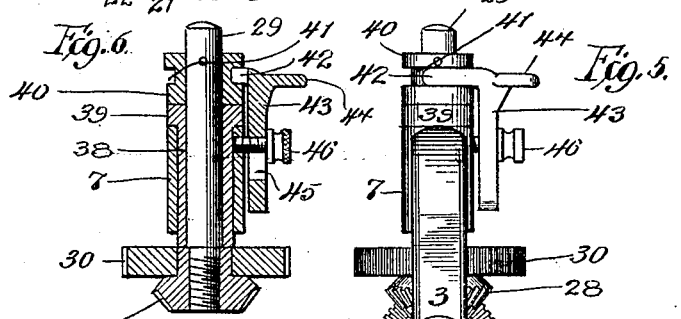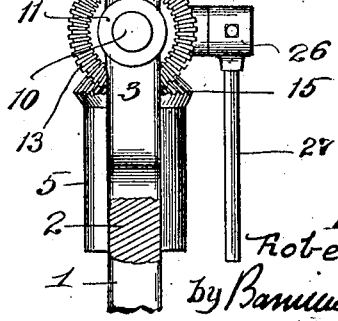

R. MILNE.
GEARING.
APPLICATION FILED AUG. 20, 1908.
913,417.
Patented Feb. 23, 1909.
3 SHEETS—SHEET 3.
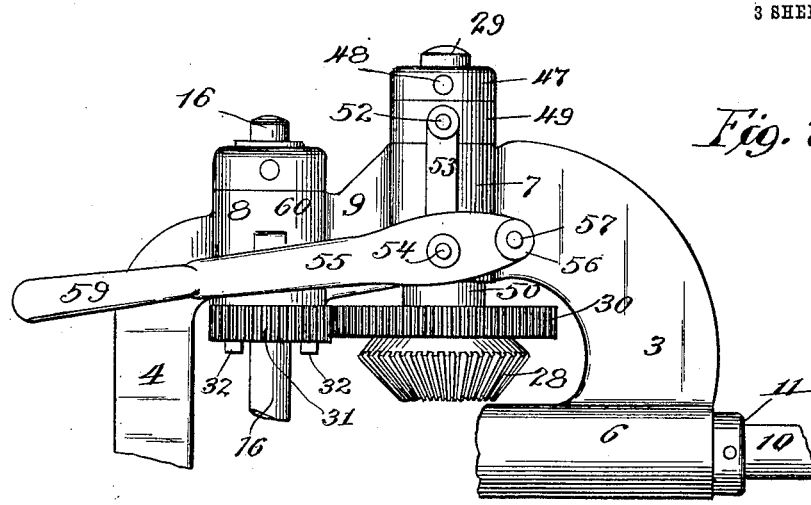
Fig. 7.
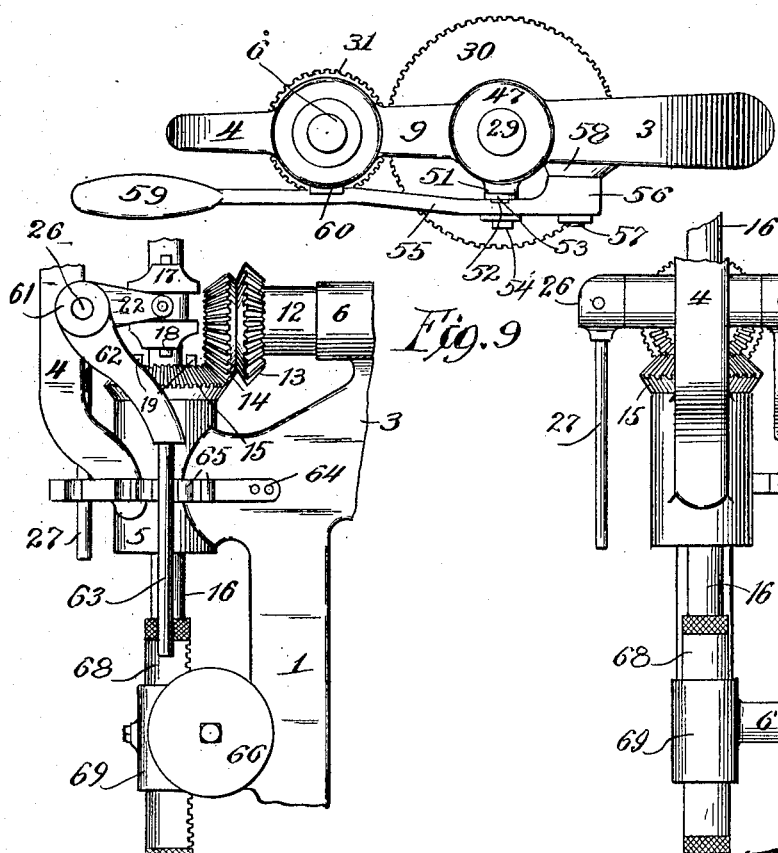
Fig. 8.
Fig. 9.
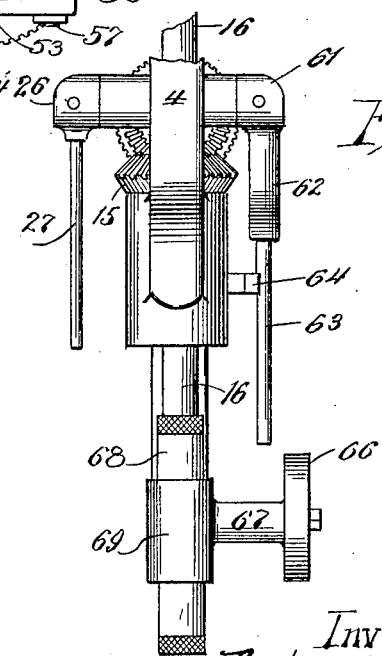
Fig. 10.
Witnesses:
Inventor:
Robert Milne
by Banning & Banning
Attys.

UNITED STATES PATENT OFFICE.

ROBERT MILNE, OF ROCKFORD, ILLINOIS, ASSIGNOR TO ROCKFORD DRILLING MACHINE COMPANY, A CORPORATION OF ILLINOIS.

GEARING.

No. 913,417.    Specification of Letters Patent.    Patented Feb. 23, 1909.

Application filed August 20, 1908. Serial No. 449,484.

*To all whom it may concern:*

Be it known that I, ROBERT MILNE, a citizen of the United States, residing at Rockford, in the county of Winnebago and State of Illinois, have invented certain new and useful Improvements in Gearing, of which the following is a specification.

It is desirable, in operating tapping attachments for drilling machines, to have the driving mechanism for the drill shaft of a construction and arrangement that will operate with the advance of the drill to revolve the shaft for drilling, and in withdrawing the drill in a reverse rotation to the shaft; and in withdrawing, the shaft should have, preferably, a more rapid rotation than the rotation for operating the drill.

The objects of this invention are to furnish a driving mechanism for giving reverse rotations to the drill shaft, and have such driving mechanism simple and effective in use; to construct and arrange a system of driving and reversing gears by means of which the drill shaft has a more rapid revolution in withdrawing than in advancing the drill; to simplify the driving mechanism for the drill shaft and have such mechanism employ as few driving gears as possible, so as to reduce friction and give an increase of rapidity in withdrawing the drill; to locate, on the main driving shaft, a double gear, or a gear having two engaging faces, one gear or face in mesh with a gear encircling the drill shaft to constantly revolve such gear; and the other gear or face coacting with a movable gear or face, through which and interposed gears, a second gear encircling the drill shaft can be driven, the two gears around the drill shaft coöperating with a sliding clutch head by means of which either gear can be made the driving gear; to enable the movable gear and its companion gear to be raised out of mesh with the gear or face on the main driving shaft, so that with the clutch engaged the drill shaft will remain stationary; to furnish means for raising and lowering the movable gear as required; to enable the operator to actuate the wheel controlling the movement of the drill holder and drill with one hand and at the same time operate the driving gear mechanism for a forward rotation or a reverse rotation of the drill shaft in advancing and withdrawing the drill, leaving the other hand of the operator free to guide and control the work being done; and to improve generally the construction and operation of the various parts and elements entering into the formation of the tapping attachment as a whole.

The invention consists in the features of construction and combinations of parts hereinafter described and claimed.

In the drawings Figure 1 is a side elevation of the tapping attachment of the present invention, positioned on the head of a drilling machine frame; Fig. 2 a similar view to Fig. 1, with the driving gear and a portion of the head of the frame in section, and showing the movable gear out of engagement with its driving gear, Fig. 1 showing the movable gear in engagement with its driving gear; Fig. 3 a top or plan view of the construction shown in Fig. 1; Fig. 4 a sectional plan view on line 4—4 of Fig. 1; Fig. 5 a front elevation of the tapping attachment of Fig. 1; Fig. 6 a sectional elevation, showing the means for raising and lowering the movable gear; Fig. 7 a side elevation showing the movable gear and a modified means for raising and lowering the same; Fig. 8 a top or plan view of the parts shown in Fig. 7; Fig. 9 a side elevation, showing a portion of the gear mechsnism and the means for raising and lowering the drill holder and drill with the arm or lever for operating the clutch between the two gears of the drill shaft in juxta relation to the hand wheel for raising and lowering the drill holder and drill; and Fig. 10 a front elevation of the parts shown in Fig. 9.

The present invention, relating, as it does, to the gear mechanism for operating the drill shaft, renders it unnecessary to show the entire drill frame, and for this reason only the head and upper portion of the drill frame is shown in the drawings, it being understood that the remainder of the drill frame can be of any usual and well known form of construction.

The head of the drill frame shown has a vertical bar or standard 1, a diagonal bar or brace 2, a curved standard or bar 3, and a side arm or support 4; and, formed integral with these parts, is a vertical bearing or journal box 5, a horizontal bearing or journal box 6, a vertical journal bearing or box 7, and a vertical bearing or journal box 8, with a web or support 9 between the journal boxes or bearings 7 and 8, so as to give rigidity and strength to the head of the frame as a whole. The main driving shaft 10 has its bearing in the horizontal journal box or bearing 6, and is held against endwise movement in one direction by a collar 11, fixedly secured to the shaft by a pin, or otherwise. The inner end of the main driving shaft 10 has, fixedly secured thereto, a sleeve or hub 12 on the main driving gear; and the face of this sleeve or hub 12 abuts against the end face of the horizontal journal box or bearing 6, so as to hold the main driving shaft against endwise movement in either direction The sleeve or hub 12 has a gear wheel 13, adjacent to which is a second gear wheel 14, and the gear wheels 13 and 14 may be formed integral, one with the other, or be separate gear wheels united, one to the other, or separately mounted on the main driving shaft, so as to revolve together and with the shaft.

The gear wheel 14 is in mesh with a gear wheel 15, encircling the drill shaft 16, and abutting against the end of the journal box or bearing 5, in the construction shown, so as to have a fixed position in its relation to the drill shaft. An endwise slidable clutch head, or member, 17, is mounted on the drill shaft, and is movable endwise on the shaft, and is keyed or splined to the shaft. This sliding clutch head 17 has, on its under face, lugs or projections 18 which, when the clutch head is in the position shown in Fig. 1, will be engaged by lugs or stops 19 on the upper face of the gear wheel 15, so that with the revolving of the gear wheel 15 from the gear wheel 14 the clutch head 17 will be revolved, transmitting rotation to the drill shaft 16 and the drill carried thereby; and the direction of the rotation of the shaft 16 is a forward one so as to cause the drill to operate as the drill is lowered.

The clutch 17, in the construction shown, has a circumferential groove 20, into which is entered pins 21 on opposite sides of the head, as shown in Figs. 1 and 4; and each pin 21 is carried by an arm 22, which arms are united, one to the other, by a cross piece or plate 23, extending laterally from a sleeve 24 fixedly attached, by a pin, or otherwise, to a rock shaft 25 mounted in the body of the arm or support 4, so that, by rocking the shaft 25 the arms 22 will be raised and lowered, causing the pins 21 to raise and lower the clutch head. The left hand end of the shaft 25, in the arrangement shown, has fixedly attached thereto the socket or head 26 of an operating arm or rod 27, so that the operator of the drill, by means of the left hand, can raise and lower the clutch head.

The gear wheel 13 can be engaged with and disengaged from a gear wheel 28 fixedly mounted on or attached to the end of an endwise slidable shaft 29, mounted in the bearing or journal box 7; and mounted on or fixedly attached to the shaft 29 is a gear wheel 30, located adjacent to the gear wheel 28, and meshing with a gear wheel 31, encircling the drill shaft 16, which gear wheel 31 abuts against the lower end face of the journal box or bearing 8, so as to have a fixed relation to the drill shaft 16, which shaft is mounted in the journal boxes or bearings 5, and 8, so as to revolve. The gear wheels 13, 14, 15 and 28 are one to one, while the gear wheels 30 and 31 are two to one, so that the gear wheel 31 has twice the revolution of the gear wheels 13, 14, 15 and 28, thereby giving twice as rapid rotation to the drill shaft 16, when the clutch head 17 is engaged with the gear wheel 31, and when the clutch head 17 is engaged with the gear wheel 15, thereby lessening the time required in withdrawing the drill. The under face of the gear wheel 31 has lugs 32 arranged to engage with lugs 33 on the upper end of the clutch head 17, when such head is in its elevated position, so that when so engaged the drill shaft 16 will be revolved by the gear wheel 31 in a reverse direction to the revolving of the drill shaft by the gear wheel 15, which wheel, when the gear wheel 31 is the acting one, runs loose around the drill shaft. The gear sleeve 36 which forms an elongated hub for the gear 31 has fixedly secured thereto a collar 34 by a pin 35, or otherwise; and the collar 34 abuts against the end face of the upper journal boxes 8 and holds the gear sleeve and gear against downward movement. The sleeve or hub 36 extends upwardly through the journal box or bearing 8; and the gear 15 has a sleeve or hub 37, which sleeve or hub extends downwardly into the journal box or bearing 5, and the sleeves or hubs 36 and 37 supporting the respective gears around the drill shaft, and in the journal boxes or bearings so as to be held firmly in position.

A sleeve 38 encircles the endwise movable shaft 29 within the journal box or bearing 7, and this sleeve has a head or flange 39 which abuts against the upper end face of the journal box or bearing 7 in the arrangement shown in Figs. 1 and 2. An endwise slidable collar 40 encircles the upper end of the endwise movable shaft 29, and is fixedly attached to the shaft by a pin or otherwise; and this collar 40 has a circumferential groove 41 into which projects the arms of a fork 42, laterally projecting from a movable plate 43 having a fingerpiece or lift 44, by which the plate, and with it the fork 42, can be raised and lowered, raising and lowering the collar 40 and with it the shaft 29, so that when the shaft is in the raised position, as shown in Fig. 2, the gear wheels 13 and 28 will be out of engagement and the rotation of the gears 30 and 31 will be stopped, preventing any rotation of the drill shaft, when the clutch lugs 32 and 33 are engaged, and with the lowering of the plate 43 the fork 42 will be moved down, carrying with it the collar 40 and causing the shaft 29 to be lowered for engaging the gear wheel 28 with the gear wheel 13, so that, when the clutch head is engaged with the gear wheel 31, the drill shaft 16 will be reversely revolved in withdrawing the drill. The plate 43 has a slot 45, through which passes the stem of a thumb or set screw 46, so that, by advancing the stem of the thumb or set screw, the plate will be held either in its elevated or lowered position, and by loosening the stem of the thumb or set screw 46, the plate can be raised or lowered as desired, and when properly adjusted can be held in that position by advancing the thumb or set screw.

The construction just described and shown in Figs. 1, 2, 3, 5 and 6, is adapted and intended for use where but little power is required to raise and lower the gear wheels 28 and 30; but, with a heavy or large drill, power means should be used for the purpose of raising and lowering these wheels. The construction shown in Figs. 7 and 8 has a collar 47 encircling the shaft 29, which collar is fixedly attached to the shaft by a pin 48, or otherwise; and between this collar 47 and the upper end face of the journal box or bearing 7 is a collar 49 in which the shaft 29 is free to revolve, the collar having a sleeve 50 which extends through and has a spline connection with the journal box or bearing 7 and is attached to or abuts against the gear wheel 30, as shown in Fig. 7.

A boss or lug 51 projects laterally from the collar 49, and receives a pin or pivot 52, to which is attached the upper end of a strap or link 53, and the lower end of the strap or link 53 has a pivot 54 connecting the strap with a lever 55, which lever has a socket or head 56, through which passes a pin or pivot 57, which enters a boss or facing 58 on the arm or bar 3 of the frame head, so that the lever 55 has a fixed pivotal point at its attached end. The outer or free end of the lever 55 has a grab or handle 59, which can be grasped by the operator of the machine to move the lever, and the lever is held in its up or down position by its edges engaging the edges of a stop 60 on the exterior of the journal box or bearing 8, as shown in Figs. 7 and 8. The downward movement of the lever 55 carries downward the head 49, and with it the sleeve 50, forcing the shaft 29 down and with it the gear wheels 30 and 28, for the gear wheel 28 to mesh with the gear wheel 13, and for the gear wheel 30 to mesh with the gear 31, to drive the gear wheel 31, and give the drill shaft 16 a reverse rotation as hereinbefore described. The lever 55, when down, has its upper edge abutting against the under edge of the stop 60, as shown in Fig. 7, so that the strap 53 will hold the collar 49 down, and with it the sleeve 50 and gears 30 and 28; and the operator, by outwardly springing the lever 55, releases the lever from engagement with the stop 60, so that the lever can be raised, raising with it the strap or link 53, and the collar 49; and the upward movement of the collar 49 raises the collar 47 and with it the shaft 29, carrying upward the sleeve 50 and with it the gears 30 and 28, and withdrawing the gear 28 from meshing with the gear 13, so as to stop rotation of the gear 31 as already described. The lever 55, when raised, has its under edge brought into engagement with the upper edge of the stop 60, holding the gears in their raised position, and so remaining until the lever 55 is released from the stop and moved downward to engage the gears as just described.

It is the usual practice to lower and raise the drill by means of a rack and pinion and a hand wheel, and, ordinarily, the hand wheel is located on the right hand side of the machine. This construction requires the operator to use the left hand for operating the rod or lever 27, or other suitable means to shift the clutch; and, where the work is required to be held by one hand, the shifting or reversing of the drill leaves the work free, except its support on the table. The present invention enables the operator, by the use of one hand, to raise and lower the drill and at the same time operate the sliding clutch head to reverse the rotation of the drill shaft. The arrangement for this purpose is shown in Figs. 9 and 10. The shaft 26, on the right hand end, has secured thereto a socket or head 61, with a downwardly depending arm 62, into which is entered the upper end of a rod or bar 63; and this rod or bar passes a spring arm or catch 64 attached to the head of the machine, and having notches or depressions 65 to be engaged by the rod or bar, and hold the rod or bar in its moved or adjusted position. The ordinary hand wheel 66 is fixedly attached to the end of a shaft which passes through a bearing 67, and has, on its end, a spur gear or pinion which, with the shaft, is not shown, but is of the usual construction. The spur gear engages the rack on the drill clamp or holder 68 which is slidable endwise in a bearing or sleeve 69, as usual in drills.

The rod or bar 63 extends downwardly and its lower end terminates in close relation to the periphery of the operating wheel 66, so that the operator can grasp the wheel 66 with his hand and use his forefinger to engage the rod or bar 63, and, as the wheel 66 is turned to cause the drill to descend, the forefinger will move the rod or bar, 63 operating the rock shaft 25, for the arms 22 to carry down the sliding head 17 for the lugs 18 to be engaged by the lugs 19 and revolve the drill shaft 16 for the drilling operation. The operator, to withdraw the drill, gives a reverse turn to the operating wheel 66, and, before doing this, can press his thumb against the opposite face of the rod or head 63, moving such bar rearward and rocking the shaft 26 to cause the arms 22 to elevate the sliding clutch head 17, for the lugs 33 to be engaged by the lugs 32, and through the gear wheel 31 reverse the rotation of the drill shaft as the drill is withdrawn, and such rotation of the drill shaft will be twice as rapid as the rotation of the shaft when the drill is being operated, thus insuring the withdrawal of the drill rapidly in a less period of time than required in advancing the drill. It will thus be seen that by means of the rod or bar 63, located adjacent to the operating wheel 66, the operator is enabled to reverse the position of the sliding clutch head as he turns the operating wheel to advance or recede the drill, thus giving the reversal of the mechanism and control of the drill, by the operator using one hand for the double purpose.

The operation of the reversing gear mechanism will be understood from the foregoing description, but briefly is as follows: The operator, by moving the clutch head downward, engages the clutch head with the continuously revolving gear 15, so that the drill shaft 16 will be rotated to operate the drill, and by moving the clutch head upwardly to engage with the gear wheel 31, the drill shaft will be reversely rotated in withdrawing the drill. The setting of the clutch head midway between the gears 15 and 31 stops rotation of the drill shaft in either direction, and the operator, by raising the gear wheels 28 and 30, can stop the rotation of the shaft in a reverse direction, or in either direction, if the clutch is not in engagement with the gear wheel 15, thus giving the operator perfect control of the reversing mechanism. It will be seen that the reversing mechanism is reduced to a minimum, thus reducing the friction and at the same time the main driving shaft, through the two gears connected and revolving therewith, enables this single shaft to revolve the drill shaft in either direction according as to which one of the two gears, or double gear, is engaged with its coacting gear. The arm or rod 63, in connection with the operating wheel 66, enables the operator to reverse the engagement of the clutch head to correspond with the direction of rotation for the drill shaft, and this by the use of one hand only, and leaving the other hand free to hold the work in position, which is a desirable feature, particularly in the operation of small drills where the work is not held by mechanical means on the table, but is held by the operator.

What I claim as new and desire to secure by Letters Patent is:

1. In a tapping attachment for drilling machines, the combination of a revoluble shaft, two gears on said revoluble shaft, a drill shaft, a lower gear encircling the drill shaft and in mesh with one of the two gears on the revoluble shaft, an upper gear encircling the drill shaft, a movable gear coöperating with the other of the two gears on the revoluble shaft, an endwise movable shaft for the movable gear in parallel relation with the drill shaft, a gear on the endwise movable shaft in mesh with the upper gear encircling the drill shaft, and a clutch connection on the drill shaft for the two gears on said shaft, substantially as described.

2. In a tapping attachment for drilling machines, the combination of a revoluble shaft, a drill shaft in right angle relation to the revoluble shaft, two bevel gears on the inner end of the revoluble shaft, an upper and a lower gear encircling the drill shaft, with the lower gear on the drill shaft in mesh with one of the gears on the revoluble shaft, a make and break gear connection for the upper gear on the drill shaft and the other of the gears on the revoluble shaft, and a clutch connection between the two gears on the drill shaft, substantially as described.

3. In a tapping attachment for drilling machines, the combination of a drill shaft, two gears loosely mounted on the drill shaft, a clutch on said shaft engaging either of said gears, a revoluble shaft at right angles thereto, two oppositely-facing bevel gears on said revoluble shaft, one of them in mesh with one of the gears on the drill shaft, and intermediate gearing between the other bevel gear and the other gear on the drill shaft, substantially as described.

4. In a tapping attachment for drilling machines, the combination of a revoluble shaft, a pair of oppositely facing gears on the revoluble shaft, a drill shaft in right angle relation to the revoluble shaft, a lower gear encircling the drill shaft and in mesh with one of the oppositely facing gears on the revoluble shaft, an upper gear encircling the drill shaft, a movable gear coöperating with the other one of the oppositely facing gears on the revoluble shaft, an endwise movable shaft for the movable gear, a gear on the endwise movable shaft in mesh with the upper gear encircling the drill shaft, and a clutch connection for the two gears on the drill shaft, substantially as described.

5. In a tapping attachment for drilling machines, the combination of a revoluble shaft, a pair of oppositely facing gears on the revoluble shaft, a drill shaft in right angle relation to the revoluble shaft, a lower gear encircling the drill shaft and in mesh with one of the oppositely facing gears on the revoluble shaft, an upper gear encircling the drill shaft, a movable gear coöperating with the other one of the oppositely facing gears on the revoluble shaft, an endwise movable shaft for the movable gear, a gear on the endwise movable shaft in mesh with the upper gear encircling the drill shaft, a clutch connection for the two gears on the drill shaft, and means for raising and lowering the endwise movable shaft, substantially as described.

6. In a tapping attachment for drilling machines, the combination of a revoluble shaft, a pair of oppositely facing gears on the revoluble shaft, a drill shaft in right angle relation to the revoluble shaft, a lower gear encircling the drill shaft and in mesh with one of the oppositely facing gears on the revoluble shaft, an upper gear encircling the drill shaft, a movable gear coöperating with the other one of the oppositely facing gears on the revoluble shaft, an endwise movable shaft for the movable gear, a gear on the endwise movable shaft in mesh with the upper gear encircling the drill shaft, a clutch connection for the two gears on the drill shaft, means for raising and lowering the endwise movable shaft, and means for moving the clutch connection on the drill shaft, substantially as described.

7. In a tapping attachment for drilling machines, the combination of a revoluble horizontal shaft, two gears mounted on and revoluble with the horizontal shaft, a revoluble vertical drill shaft, a lower gear on the drill shaft, an upper gear on the drill shaft, a clutch member slidable on the drill shaft and adapted to engage with both the lower and upper gears on the drill shaft, a rotatable vertical shaft endwise slidable, a gear connection on the endwise slidable vertical shaft for connecting the upper gear on the drill shaft with one of the gears on the horizontal shaft, and means for raising and lowering the vertical and endwise slidable shaft for connecting and disconnecting the gears carried by said shaft with the gear on the horizontal shaft, substantially as described.

8. In a tapping attachment for drilling machines, the combination of a revoluble horizontal shaft, gears mounted on and revoluble with the horizontal shaft, a revoluble vertical drill shaft, a lower gear on the drill shaft, an upper gear on the drill shaft, a clutch member adapted to be thrown into engagement with both the lower and upper gears on the drill shaft, a revoluble and endwise slidable vertical shaft, and intermediate gears carried by the endwise slidable shaft for connecting and disconnecting the upper gear on the drill shaft with one of the gears on the horizontal shaft, substantially as described.

9. In a tapping attachment for drilling machines, the combination of a revoluble horizontal shaft, gears mounted on and revoluble with the horizontal shaft, a revoluble vertical drill shaft, a lower gear on the drill shaft, an upper gear on the drill shaft, a clutch member adapted to be thrown into engagement with both the lower and upper gears on the drill shaft, a revoluble and endwise slidable vertical shaft, intermediate gears carried by the endwise slidable shaft for connecting and disconnecting the upper gear on the drill shaft with one of the gears on the horizontal shaft, and means for endwise moving the vertical shaft and making and breaking the connection between the gear on the drill shaft and the gear on the horizontal shaft, substantially as described.

ROBERT MILNE.

Witnesses:
    WALKER BANNING,
    PIERSON W. BANNING.